TETSUYA TAKANO
TAKAO SHIBATA
INVENTORS

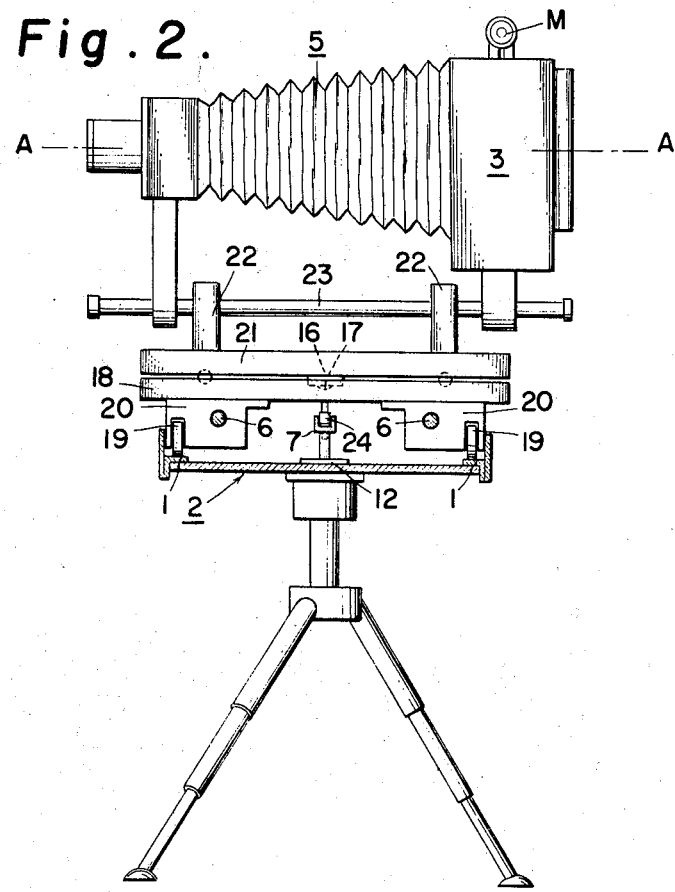
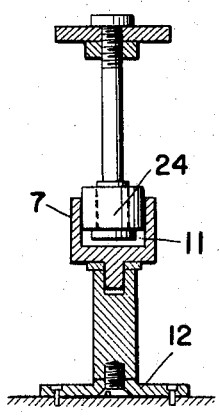
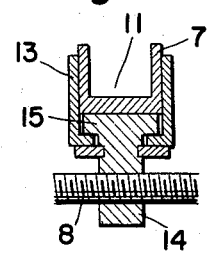
Fig. 2.
Fig. 4.
Fig. 3.
TETSUYA TAKANO
TAKAO SHIBATA
INVENTORS
Semmes & Semmes
ATTORNEYS

United States Patent Office

3,503,316
Patented Mar. 31, 1970

3,503,316
APPARATUS FOR PRODUCING STEREOSCOPIC PICTURES
Tetsuya Takano and Takao Shibata, Tokyo, Japan, assignors to Toppan Printing Company Limited, Tokyo, Japan
Filed Nov. 8, 1966, Ser. No. 592,899
Claims priority, application Japan, Nov. 9, 1965, 40/68,298
Int. Cl. G03b *35/04*
U.S. Cl. 95—18                                           2 Claims

ABSTRACT OF THE DISCLOSURE

Apparatus for taking stereoscopic pictures, including a base for supporting the camera for lateral and pivotal movement with respect to the screen image, a camera mounted upon the base and including means for positioning a lenticular screen which is laterally movable with respect to the film supported within the camera. The prior art shows means for laterally and pivotally moving a stereoscopic camera but does not suggest means for independently moving the lenticular screen within the camera.

---

This invention relates to improved apparatus for taking stereoscopic pictures, capable of being easily handled by operators. The so-called stereoscipic pictures are embodied in several ways, the stereoscopic picture relating to the present invention is the type using a lenticular screen which consists of many adjacent, parallel and vertically cylindrical lenses.

In the making of stereoscopic pictures, it has been customary to arrange a group of objects or a single object as desired and to then move a camera along a fixed arcuate path at a predetermined distance from a single object or a predetermined distance from a point located in the midst of a group of objects and exposing a series of pictures as the camera travels which will provide a picture when properly viewed having stereoscpic properties.

This manner of taking stereoscopic pictures is, however, extremely limited, in that the camera is only capable of being moved along a single predetermined arcuate path and consequently, the distance between the camera and the object or objects cannot be varied and the possible arrangements and effects are extremely limited.

The present invention is directed primarily to the provision of apparatus which can be made readily portable and is easy to adjust for different object distances.

To take the abovementioned stereoscopic pictures, the present invention embodies a camera having a built-in lenticular screen, which is arranged directly in front of the photosensitive film and during the movement of the camera from one outermost position to the other outermost position, the screen is shifted for the distance of a screen line and the direction of the camera is always held toward the center of the object when the camera is taking stereoscopic pictures shifting along the straight track which is perpendicular to the optical axis between the object and apparatus.

In the past, apparatus of this kind were troublesome in operation and were inconvenient in shooting outdoor scenes because of their largeness in size and weight. Some of them were incapable of taking photographs of distant views because of their poor devices of adjusting view taking angles.

It is the object of the present invention to provide such an apparatus that is compact and serviceable, while capable of being carried to take outdoor scenes without any difficulty. Another object is the provision of the apparatus of which direction to the object can be easily and precisely adjusted when the camera is moving on the streight track.

The various features and advantages of the invention may be more fully understood from the drawings, which illustrate an embodiment of the invention, and the following description thereof.

In the drawings:

FIGS. 2, 3 and 4 are respectively vertical sectional views taken along the lines II—II, III—III and IV—IV of FIG. 1.

Figure 1:
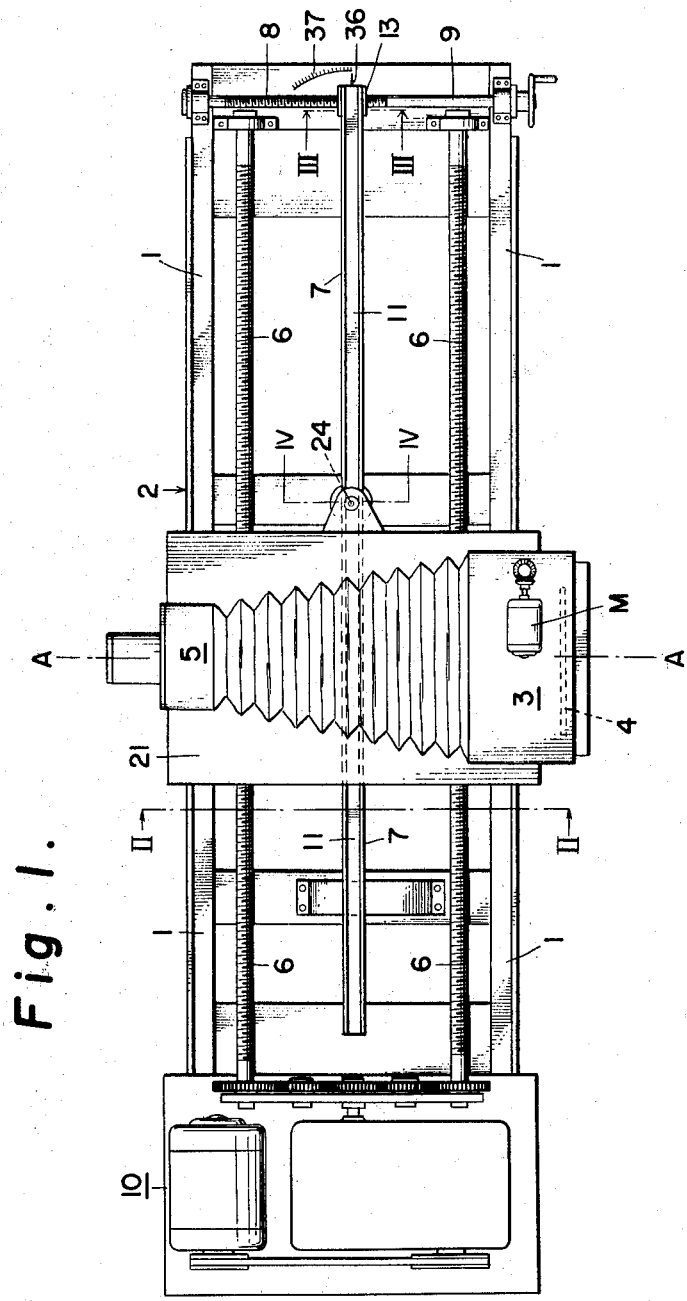
FIG. 1 is a plan view of the preferred embodiment of the invention.
Figure 5:
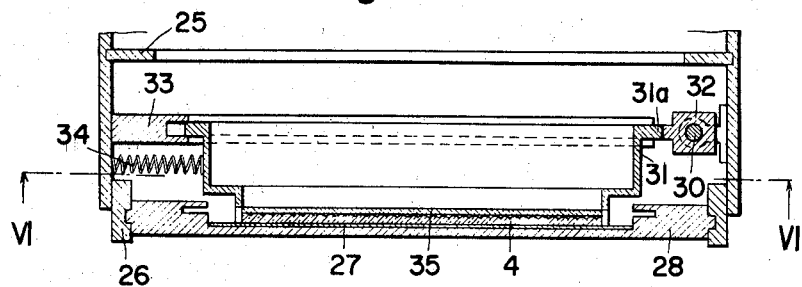
FIG. 5 is a plan sectional view of the film loading part being situated on the rear portion of the camera.
Figure 6:
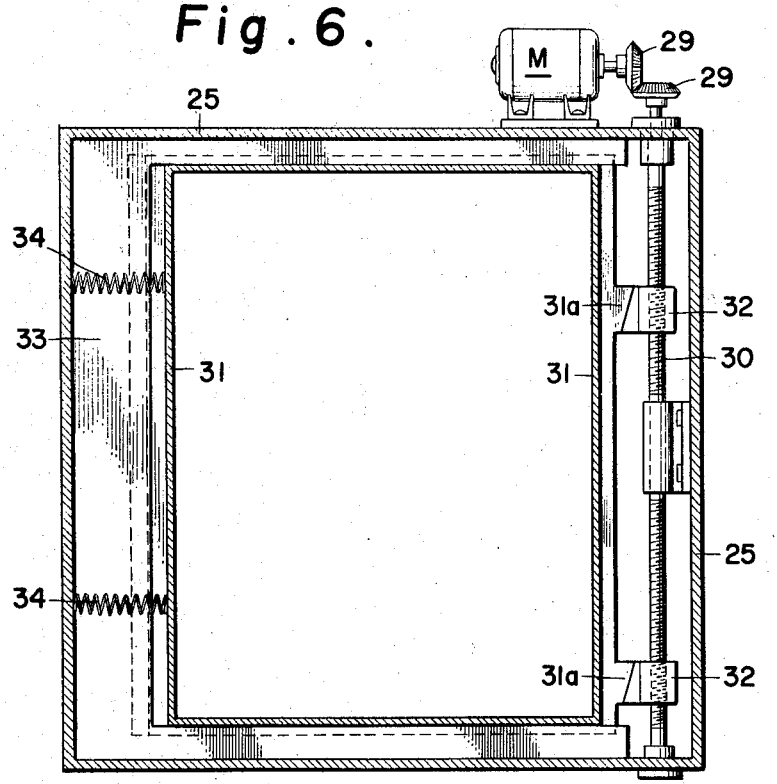
FIG. 6 is a vertical sectional view taken along the line VI—VI of FIG. 5.

Referring to the figures, the apparatus of the present invention comprises a rectangular supporting base 2 of suitable construction along both edges of which a pair of straight parallel tracks 1 are supported, and a camera 5 which is fitted with a movable lenticular screen 4 in a film loading part 3. And a supportion base 2 is provided with a pair of leading screws 6 which are rotatable and parallel to the tracks 1, and the end portions of the said tracks 1 are provided with an adjusting rod 9 having an adjusting screw 8, the said screw 8 is coupled with a guiding rail 7 on its end to regulate the direction of the camera 5, and at the other end portion of the tracks 1, leading screws 6 are coupled with a driving apparatus 10 by driving gears, the said apparatus 10 comprises a motor and a gear-box and gives rotations of the same direction to the leading screws 6.

The guiding rail 7 has a guiding groove 11 on its upper side, the center portion of which is kept slidably in contact with the stand 12 on the base 2, and the one end of the rail 7 is provided with a holder 13 which holds a sliding piece 15 and a threaded pin 14. The threaded pin 14 is coupled with the adjusting screw 8 of the rod 9, and with rotations of the adjusting rod 9 the end portion of the guiding rail 7 is moved by the adjusting screw 8 and the threaded pin 14, and thus the guide rail 7 is successfully inclined making the trunnion 24 the fulcrum.

The supporting plate 18 moves on the straight tracks 1 with the rotation of leading screws 6 and beneath the plate follower blocks 20 are attached which are threaded with leading screws 6 and be fitted with rollers 19, the said rollers move on the straight tracks 1. On the supporting plate 18, an upper plate 21 is pivotally fitted to the pivot 17 making the center 16 an axis. The camera 5 is mounted to the supporting bar 23 which is laid on a pair of brackets 22 on the center line of the upper plate 21 keeping the optical axis A—A of the camera to the said center line, and a trunnion 24 is provided to the center on the one side edge of the upper plate 21, the said trunnion 24 is fitted into the guiding groove 11 of the guiding rail 7. By the combination of the trunnion 24 and the guiding rail 7, the upper plate 21 traces an arc-shaped locus, and the direction of the camera 5 is kept to the center of the object during the lateral movement of the supporting plate 18.

The film loading portion 3 of the camera 5 is covered by the outer frame 25 and provided with a film holder frame 26, the said frame 26 is fitted with film holder 28 which holds a sheet of film 27. A motor M is provided on the outer frame 25 which rotates the shaft 30 being coupled with bevel gears 29, and the shaft 30 is threaded with a pair of blocks 32 to give a lateral movement of the lenticular screen frame 31.

The side faces of the blocks 32 being inclined and contacting the inclined projections 31a fitted on the side of the frame 31, upward movement of the blocks 32 by rotations of the shaft 30 causes a slight movement of the frame 31 against the coil springs 34 in the slide frame 33 which is provided with a shade frame and a slide surface. While downward movement of the blocks 32 by counter rotations of the shaft 30 allows the frame 31 to be pushed back by the spring 34 in contrast with the above movement. So the lenticular screen 4, fitted on the back surface of the frame 31 holding a pane of glass 35 in-between, moves laterally to the film 27 fixed to the said outer frame 25. This movement of the lenticular screen 4 is synchronized with the lateral movement of the camera 5 along the straight tracks 1, and the compensation of the direction of the camera 5 during its movement by the rotations of leading screws 6 is achieved by the guiding rail 7, the center of which is kept in slidable contact by the stand 12 on the base 2 and the one end portion of which is coupled with the adjusting rod 9.

The shifting distance of the camera 5 and the compensating angle for the camera are fixed taking into consideration of many conditions such as the situations of the objects, the selective parallax effect, the distance L between the center of the object O and the center of the camera P, and so forth. In substance, the angle $\theta$ of the guiding rail 7 is obtained by the following formula, where the center of the object O and the center of the camera P is set on the optical axis X–X′, $a$ is the distance between the center of the camera P and the trunnion C which moves along the guiding rail 7, $l$ is the distance of movement of the camera and $\Theta$ is compensation angle of the optical axis of the camera A—A.

Figure 7:
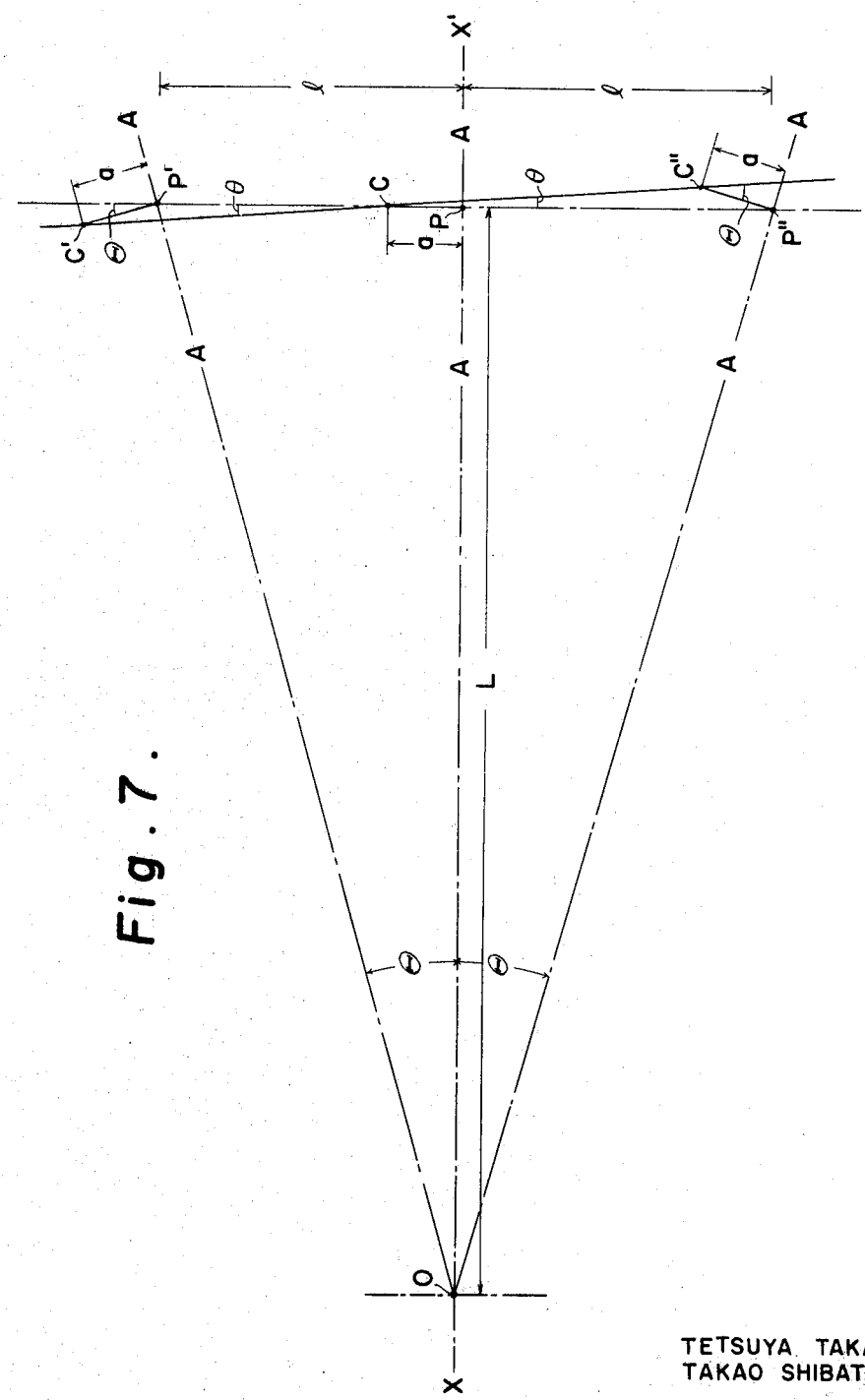
FIG. 7 is a diagram explaining the principle of the invention.
Figure 8:
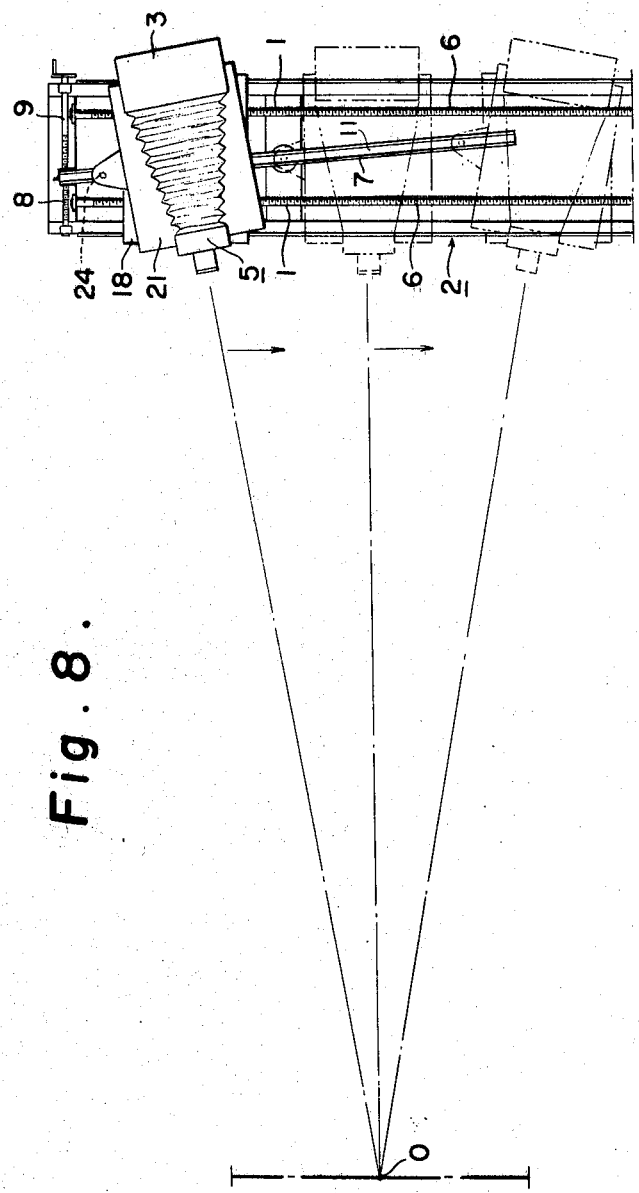
FIG. 8 is a plan view of the apparatus, showing the relations of the camera and the object in various lateral positions.

In FIG. 7, upon comparing the triangles, it will be observed that there exists the relationships as follows, when the center of the camera is moved from P to P′, and the trunnion is moved from C to C′, $$\tan \theta = \frac{a \sin \Theta}{(l-a)+a \cos \Theta}$$

and in the counter case that the center of the camera is moved from P to P″, and the trunnion is moved from C to C″, $$\tan \theta = \frac{a \sin \Theta}{(l+a)-a \cos \Theta}$$

therefore, the following formula is led when the center of the camera P is moved from P′ to P″, $$\tan \theta = \frac{a \sin \Theta}{l \mp a(1-\cos \Theta)}$$

and the stereoscopic picture of the view taking angle 2$\Theta$ previously fixed is successfully taken by setting the guiding rail 7 at the scale of $\theta$ led from the above formula.

The operation of setting $\theta$ of the guiding rail 7 is carried out by rotations of adjusting rod 9 fixed on the end portions of the straight tracks 1 and the guiding rail 7 is pivotally inclined at the center portion. This inclination of $\theta$ is confirmed by an indicator 36 on the end portion of the guiding rail and a scale 37 on the supporting base 2.

Thus the supporting plate 18 is moved on the straight tracks 1 from the point P′ to the point P″ with the rotation of leading screws 6 by the driving apparatus, the trunnion 24 which is fixed at the side portion of the upper plate 21 traces the guiding groove 11 of the guiding rail 7, the direction of the camera is compensated by the inclination of the guiding rail 7 and the camera is always facing to the object to take successfully stereoscopic pictures.

It will be evident that various details of the apparatus aforementioned may be changed without departing from the scope of the present invention and the specific embodiments described and shown herein are intended as merely illustrative and in no way restrictive of the invention.

What is claimed is:
1. An apparatus for taking stereoscopic pictures, comprising:
 (A) a supporting base having a pair of leading screws rotated by driving means and a guiding rail capable of being optionally inclined;
 (B) a supporting plate being pivoted with respect to said base and having an upper plate and threaded with said leading screws;
 (C) a camera mounted on said upper plate and provided with a lenticular screen movable laterally with respect to film supported within said camera and synchronously with respect to movement of said base upon said leading screws, said screen including:
  (i) an outer stationary frame having a film holding slot and a lenticular screen slot and including:
   (a) compression springs exteriorly laterally extending inwardly of one side, towards said screen;
   (b) a threaded bolt extending from top to bottom of said frame at the other side and having threaded thereon a plurality of cam elements;
   (c) threaded bolt drive means supported on top of said frame;
  (ii) an inner screen positioned for lateral reciprocation within said screen slot and transversely of said film holding slot, said screen abutting said compression springs at one side and at the other side having a plurality of cam projections complementally engaging the cam projections upon said threaded bolt;
 (D) a trunnion fitted on said upper plate and slidably fixed to said guiding rail, said upper plate being given a compensating rotation by said guiding rail and said trunnion when the supporting plate and the upper plate is moved by rotation of said leading screws, the direction of the camera on the upper plate thus being kept to the center of the object.
2. An apparatus as claimed in claim 1, wherein the direction of the camera is always kept toward the center of the objects to be photographed by the guiding rail and the trunnion of the upper plate, and the said direction is kept in accordance with the relationship,

$$\tan \theta = \frac{a \sin \Theta}{l \pm a(1-\cos \Theta)}$$

wherein $\theta$ is the inclination of the guiding rail to compensate the camera direction, $a$ is the distance between the center of the camera and the trunnion, $l$ is the distance of movement of the camera and $\Theta$ is compensating angle of the optical axis of the camera.

References Cited

UNITED STATES PATENTS

| | | | |
|---|---|---|---|
| 2,400,455 | 5/1946 | Donaldson | 95—86 |
| 2,572,994 | 10/1951 | Dudley | 95—18 |
| 2,175,114 | 10/1939 | Friedmann. | |

JOHN M. HORAN, Primary Examiner